(12) United States Patent
Solotorevsky

(10) Patent No.: US 8,050,989 B2
(45) Date of Patent: Nov. 1, 2011

(54) METHODS, SYSTEMS AND COMPUTER CODE FOR FINDING OUTLIER HYPER CELLS IN MULTIDIMENSIONAL HIERACHICAL DATA SETS

(75) Inventor: Gad Solotorevsky, Even Yehuda (IL)

(73) Assignee: Cvidya Networks Ltd., Tel-Aviv (IL)

( * ) Notice: Subject to any disclaimer, the term of this patent is extended or adjusted under 35 U.S.C. 154(b) by 0 days.

(21) Appl. No.: 12/600,516

(22) PCT Filed: May 20, 2008

(86) PCT No.: PCT/IL2008/000684
§ 371 (c)(1),
(2), (4) Date: Nov. 17, 2009

(87) PCT Pub. No.: WO2008/142682
PCT Pub. Date: Nov. 27, 2008

(65) Prior Publication Data
US 2010/0161464 A1 Jun. 24, 2010

Related U.S. Application Data

(60) Provisional application No. 60/939,068, filed on May 20, 2007.

(51) Int. Cl.
*G07F 19/00* (2006.01)
*H04M 15/00* (2006.01)
*G06F 7/00* (2006.01)
*G06F 17/30* (2006.01)

(52) U.S. Cl. .......................... 705/34; 707/790

(58) Field of Classification Search .................. None
See application file for complete search history.

(56) References Cited

U.S. PATENT DOCUMENTS

| | | | |
|---|---|---|---|
| 6,920,450 B2 * | 7/2005 | Aono et al. | 707/739 |
| 7,191,181 B2 * | 3/2007 | Chaudhuri et al. | 1/1 |
| 2002/0133441 A1 * | 9/2002 | Tanaka | 705/35 |
| 2004/0068199 A1 * | 4/2004 | Echauz et al. | 600/544 |
| 2007/0087756 A1 * | 4/2007 | Hoffberg | 455/450 |

* cited by examiner

*Primary Examiner* — Asfand Sheikh
(74) *Attorney, Agent, or Firm* — Browdy and Neimark, PLLC

(57) ABSTRACT

A method and system for identifying outlier hyper-cells in an N-dimensional hierarchical datset having dimensions {x1, …xN} are provided. In some embodiments, the method is applied recursively where (i) in accordance with outlier 'scores,' hypercells of a hypcell set $P_{GIVEN}$ are categorized S201 as 'likely-outlier' or 'winners' while other hypercells are (at least initially) rejected as a set of 'losers'; (ii) scores of hypercells of a subset of the initially rejected 'losers' are analyzed, and in accordance with these scores a subset of 'winners of losers' are selected S209; (iii) one-level extensions S213 of at least some hypercells of these 'winners of losers' are formed; (iv) a recession set S226 is formed where at least one 'extension' hypercell hc is included in the recusion set only if the hypercell is not a previously considered hypercell and/or a subcell of a previously categorized (and/or reported) as 'outlier' hypercell; (v) the aforementioned steps are repeated after setting $P_{GIVEN}$ to the recursion set. In some embodiments, the hypercells are indicative of discrepancies between measurements provided by two different metering systems.

18 Claims, 3 Drawing Sheets

METHODS, SYSTEMS AND COMPUTER CODE FOR FINDING OUTLIER HYPER CELLS IN MULTIDIMENSIONAL HIERACHICAL DATA SETS

RELATED APPLICATIONS

This patent application is a National Stage of PCT/IL2008/000684 filed on May 20, 2008, which claims priority of U.S. Provisional Application No. 60/939,068 filed May 20, 2007, the contents of which are incorporated herein by reference.

FIELD OF THE INVENTION

The present invention relates to methods and systems for finding outliners in Multidimensional Hierarchical Data Sets.

BACKGROUND AND RELATED ART

Outliers (aka anomalies) are rare or atypical data objects that do not comply with the general behavior or model of the data. The statistics community has studied outlier detection extensively. A typical method for finding outliers includes building a clustering model of the data, and tagging all the data elements which do not belong to any cluster as outliers. Another typical technique is to fit a distribution function to the data, and tagging all those data points whose distance of the mean of the distribution function is more than a predefined number multiplied by the standard deviation as outliers. A Multidimensional Hierarchical Dataset can be represented as an OLAP Cube (aka cube, aka hypercube). Typical outlier search techniques will seek low level cells of the cube (i.e which correspond to the original elements of the dataset) as outliers.

SUMMARY OF EMBODIMENTS

The present invention relates to methods and systems for finding outliners in Multidimensional Hierarchical Data Sets.

In particular, a method and system for identifying outlier hyper-cells in an N-dimensional hierarchical datset having dimensions $\{x_1, \ldots x_N\}$ are provided. In some embodiments, the method is applied recursively where (i) in accordance with outlier "scores," hypercells of a hypcell set $P_{GIVEN}$ are categorized S021 as "likely-outlier" or "winners" while other hypercells are (at least initially) rejected as a set of "losers"; (ii) scores of hypercells of a subset of the initially rejected "losers" are analyzed, and in accordance with these scores a subset of "winners of losers" are selected S209; (iii) one-level extensions S213 of at least some hypercells of these "winners of losers" are formed; (iv) a recussion set S226 is formed where at least one "extension" hypercell hc is included in the recusion set only if the hypercell is not a previously considered hypercell and/or a subcell of a previously categorized (and/or reported) as 'outlier' hypercell; (v) the aforementioned steps are repeated after setting $P_{GIVEN}$ to the recursion set. In some embodiments, the hypercells are indicative of discrepancies between measurements provided by two different metering systems.

In different embodiments, the presently disclosed techniques are useful for locating multiple "large" hypercells that are outliers, without a need to exhaustively search subcells of the identified "larger" outlier hypercells.

Once the outlier hypercells are identified, one or more actions may be taken. In one non-limiting example, a description of the identified outlier hypercells is output to a user, for example, via a display screen or as a printed report.

Alternatively or additionally, in some examples, the outlier hypercells describe situations in which a subscriber was underbilled or overbilled. Thus, in some embodiments, the subscriber may be billed (i.e. if s/he was previously underbilled) or provided with a refund (i.e. if s/he was previously overbilled) in accordance with the identities of the outlier hypercells.

Alternatively or additionally, one or both of the metering systems may be "fixed" or "adjusted" (for example, by adjusting an operating parameter) in an attempt to correct, in the future, the cause of the "discrepancy" that caused the outlier hypercell.

It is now disclosed for the first time a method of identifying outlier hyper-cells in an N-dimensional hierarchical datset having dimensions $\{x_1, \ldots x_N\}$. The method comprises: a) given a plurality $P_{GIVEN}$ of hypercells $\{h_1, \ldots h_M\}$ for the N dimensions, each said hypercell $h_i \epsilon P_{GIVEN}$ having a respective participating-dimension set $D_i \subset \{x_1, \ldots x_N\}$, for said each hypercell $h_i$ of said given plurality $P_{GIVEN}$ categorizing, in accordance with a respective outlier score of said each hypercell $h_i$, said each hypercell $h_i$ as one of: i) a likely outlier hypercell; and ii) a less-likely outlier hypercell, such that: i) a first categorized plurality $P^1_{CAT}$ of said hypercells is categorized as likely-outliers; and ii) a second categorized plurality $P^2_{CAT}$ of said hypercells is categorized as less-likely-outliers; b) selecting a sub-plurality $P_{SUB} \subset P^2_{CAT}$ of hypercells $\{k_1, \ldots k_L\}$ from said second categorized plurality $P^2_{CAT}$ of less-likely-outliers in accordance with said outlier scores of hypercells said sub-plurality $P_{SUB} \subset P^2_{CAT}$ of hypercells; c) from said sub-plurality $P_{SUB}$ of hypercells, forming a one-level-extension hypercell set of $P^1_{EXT}$ including, for each hypercell $k_j$ of $P_{SUB}$, a respective at least one one-level extension of said each hypercell of $k_j$ of $P_{SUB}$; d) defining a set $P'_{GIVEN}$ which includes at least some hypercells of $P^1_{EXT}$ such that there is at least one one-level-extension hypercell hc, which is a one-level extension of a member cell mc $mc \epsilon P^2_{CAT}$ that is included in $P'_{GIVEN}$ only if: i) hc is not a previously considered hypercell; ii) hc is not a subcell of a previously categorized likely-outlier hypercell; and e) assigning $P_{GIVEN} = P'_{GIVEN}$ and repeating steps (a)-(d).

In some embodiments, hypercells of $P_{GIVEN}$ are dimensionally inhomogenous.

In some embodiments, hypercells of $P_{GIVEN}$ are dimensionally homogenous.

In some embodiments, a majority of hypercells of $P_{GIVEN}$ are primitive hypercells where every dimension participates.

In some embodiments, $P_{GIVEN}$ includes primitive hypercells from a majority of dimensions of the N dimensions of the dimensions $\{x_1, \ldots x_N\}$.

In some embodiments, $P_{GIVEN}$ includes a majority of possible primitive hypercells.

In some embodiments, $P_{GIVEN}$ is a majority spanning plurality of hypercells.

In some embodiments, the one-level extension of step (c) is dimensionally homogeneous.

In some embodiments, the one-level extension of step (c) is dimensionally inhomogenous.

In some embodiments, $P'_{GIVEN}$ includes, for at least one hypercell of $P^2_{CAT}$, a majority of possible one-dimensional extensions which are not previously considered hypercells and not subcells of a previously categorized likely-outlier hypercell.

In some embodiments, i) the hypercells are descriptive of discrepancies between two metering systems; and ii) the method further comprises: e) in accordance with identities of the categorized outlier hypercells of a plurality of iterations of step (b) providing a representation the categorized outlier hypercells to a user.

In some embodiments, i) the hypercells are descriptive of discrepancies between two metering systems; and ii) the method further comprises: e) in accordance with identities of the categorized hypercells of a plurality of iterations of step (b), billing or crediting a subscriber.

In some embodiments, i) the hypercells are descriptive of discrepancies between two metering systems; and ii) the method further comprises: e) in accordance with identities of the categorized hypercells of a plurality of iterations of step (b), adjusting an operating parameter of at least one of the two metering systems.

In some embodiments, both metering systems measures at least one of water consumption, oil consumption, gas consumption, electricity consumption and telecommunications services consumption.

It is now disclosed for the first time a system for identifying outlier hyper-cells in an N-dimensional hierarchical datset having dimensions $\{x_1, \ldots x_N\}$, the system comprising: a) a data storage 310 for storing a representation of a plurality $P_{GIVEN}$ Of hypercells $\{h_1, \ldots h_M\}$ for the N dimensions, each said hypercell $h_i \epsilon P_{GIVEN}$ having a respective participating-dimension set $D_i \subset \{x_1, \ldots x_N\}$, for said each hypercell $h_i$ of said given plurality $P_{GIVEN}$; b) a hypercell categorizer 330 for categorizing S201, in accordance with a respective outlier score of said each hypercell $h_i$, said each hypercell $h_i$ as one of: i) a likely outlier hypercell; and ii) a less-likely outlier hypercell, such that: i) a first categorized plurality $P^1$CAT of said hypercells is categorized as likely-outliers; and ii) a second categorized plurality $P^2$CAT of said hypercells is categorized as less-likely-outliers; c) a hypercell selector 350 operative to select S209 a sub-plurality $P_{SUB} \subset P^2$CAT of hypercells $\{k_1, \ldots k_L\}$ from said second categorized plurality $P^2$CAT of less-likely-outliers in accordance with said outlier scores of hypercells said sub-plurality $P_{SUB} \subset P^2$CAT of hypercells; d) a hypercell extendor 370 operative to form S213 from said sub-plurality $P_{SUB}$ of hypercells, a one-level-extension hypercell set of $P^1$EXT including, for each hypercell $k_j$ of $P_{SUB}$, a respective at least one one-level extension of said each hypercell $k_j$ of $P_{SUB}$; e) a recursion set selector 410 operative to define S225 a set $P'_{GIVEN}$ which includes at least some hypercells of $P^1$EXT such that there is at least one one-level-extension hypercell hc, which is a one-level extension of a member cell mc mc$\epsilon P^2$CAT that is included in $P'_{GIVEN}$ only if: i) hc is not a previously considered hypercell; ii) hc is not a subcell of a previously categorized likely-outlier hypercell; and f) a recursion manager 430 operative to: A) pass the representation of $P_{GIVEN}$ to the hypercell categorizer 330 and receive a representation of $P^2$CAT from the hypercell categorizer 330; B) pass the received representation of $P^2$CAT to the hypercell 350 selector and receive a representation of $P_{SUB}$ from the hypercell selector 350; C) pass the received representation of $P_{SUB}$ to the hypercell extender 360 and receive a representation of $P^1$EXT from the hypercell extender 360; D) pass the representation of $P^1$EXT to the recursion set selector 350 and to receive a representation of $P'_{GIVEN}$ from the recursion set selector 350; E) set $P_{GIVEN} = P'_{GIVEN}$ in the memory and repeat steps (A)-(D).

In some embodiments, the hypercells are descriptive of discrepancies between two metering systems, and the system further comprises: g) a user output module 190 configured, in accordance with identities of the categorized outlier hypercells of a plurality of iterations of step (b), to provide a representation the categorized outlier hypercells to a user.

In some embodiments, the hypercells are descriptive of discrepancies between two metering systems, and the system further comprises: g) a billing adjuster 170 configured, in accordance with identities of the categorized outlier hypercells of a plurality of iterations of step (b), to bill or credit a subscriber.

In some embodiments, the hypercells are descriptive of discrepancies between two metering systems, and the system further comprises: g) a meter adjuster 180 configured, in accordance with identities of the categorized outlier hypercells of a plurality of iterations of step (b), to adjust an operating parameter of at least one of the metering systems.

It is noted that features described above as pertaining to certain embodiments may also be included in other embodiments, unless indicated to the contrary hereinbelow.

DETAILED DESCRIPTION OF EMBODIMENTS

Figure 1:
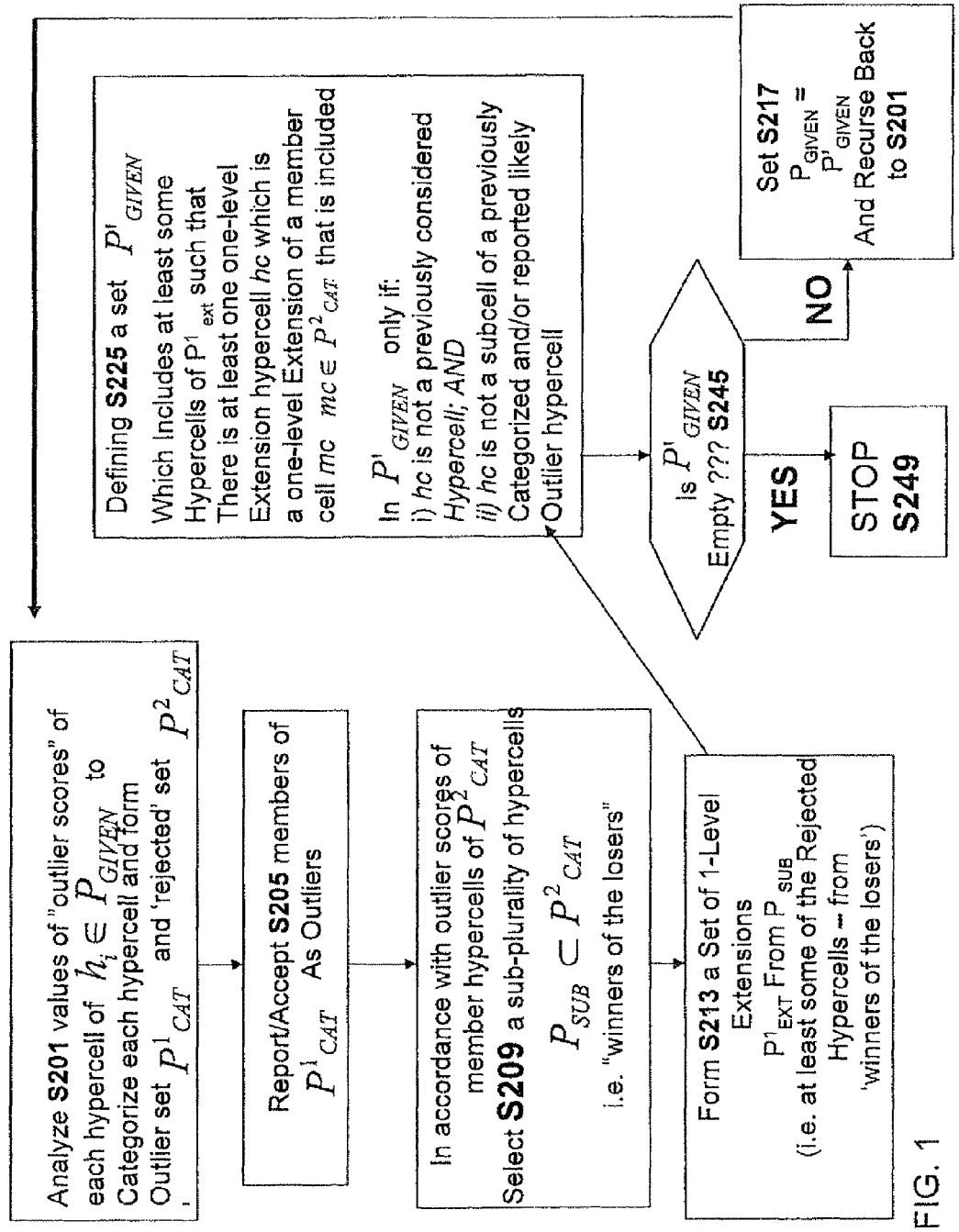
FIG. 1 provides a flow chart of an exemplary routine for identifying outlier hypercells.

The present invention will now be described in terms of specific, example embodiments. It is to be understood that the invention is not limited to the example embodiments disclosed. It should also be understood that not every feature of the presently disclosed apparatus, device and computer-readable code for finding outliners in Multidimensional Hierarchical Data Sets is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Exemplary multi dimensional hierarchical data sets include but are not limited to traffic volumes in a telecommunication network, Call Detailed Records (CDRs) in a mediation system, or CDRs in a billing system.

In accordance with some embodiments of the present invention, methods are disclosed. It is noted that unless specified otherwise, these methods, systems and computer readable code can be implemented as software, hardware, or a combination thereof.

Exemplary Use Case/Application

In one non-limiting use case, the presently-disclosed technique for finding outliners in Multidimensional Hierarchical Data Sets is useful for detecting data inconsistencies which lead to Revenue leakage in a Communication service provider. A typical situation in a communications service provider environment is that the information about calls is generated by the switches, latter is processed by a mediation system, and latter by the billing systems, moreover equivalent calls information is generated by the signaling system (e.g., SS7). All these points Switch, Signaling System, Mediation, and Billing, have similar information; yet not exactly the same information. The causes for the differences may be various, e.g., different call rounding and duration calculation methods, rightfully dropped information (test calls dropped by the mediation, 0 duration calls dropped by the billing), or dropped due to mal-function, e.g., an overloaded Switch may stop producing CDRs to reduce its overload. Having discrepancies between the systems information, is not yet an alarming sign, having "unusual" levels of discrepancies, is an alarming sign that should be investigated and solved. Unusual levels of discrepancies, also traduce themselves to Revenue leakages (the Communication service provider do no charge for all the relevant calls). By identifying these outliners, finding the cause, and solving it, communication server providers can increase their revenues significantly. The speed in which this process takes place also has a great economical impact.
Brief Non-Limiting Discussion of Other Applications/Use Cases The aforementioned use case/application relates to just one example of a "metering system"—i.e. outliers or discrepancies between data generated by two metering systems measuring the same "metered commodity" are detected.

Other metered commodities include but are not limited to energy/power consumption, computer resource consumption, and water consumption.
Multidimensional Hierarchical Datasets and A Discussion of OLAP Nomenclature It is now disclosed for the first time a method for finding outliner hyper cells in Multidimensional Hierarchical Datasets. The presently disclosed method includes analyzing a multi dimensional data set for outliners (aka anomalies). For the sake of simplicity we will address the Multidimensional Hierarchical Datasets as if it is represented by an OLAP cube (aka cube, aka hypercube), and we will use the common OLAP nomenclature. This is done only for simplicity sake, the method and invention apply to Multidimensional Hierarchical Datasets none regarding their representation, and moreover it is always possible to represent a multidimensional hierarchical dataset as an OLAP cube. The OLAP cube is compounded from two types of values Dimensions, and Measurements, for the sake of simplicity we will assume that it includes a single measurement It should be noted that a Multidimensional Dataset is a special case of an Multidimensional Hierarchical Dataset, therefore the disclosure invention applies also to Multidimensional Hierarchical Dataset.

Given a hyper-cube with one or more dimension, which might be hierarchical dimensions, and at least one measurement, the following definitions are provided.

A hyper-cell is a slice of a cube in which 1) At least one of the dimensions of the cube participates, 2) for each dimension that participates at exactly one value is selected A hyper-cell can be represented as a set of pairs, in which each pair includes a dimension name, and one of the dimension possible values.

The degree of a hyper-cell is the number of dimensions that participate in it

A cell is a slice of a cube for which 1) All the dimensions of the cube participate, 2) for each dimension that participates, exactly one value is selected A cell (also referred to as a 'primitive hypercell' or 'lowest level hypercell') is a special case of a hyper-cell.

For a given single dimension, there is a set of possible values for primitive hypercells of the dimension. For example, for the dimension "Day of the Week" the set of possible values is {Sunday, Monday, Tuesday, Wednesday, Thursday, Friday, Saturday}. For the dimension "Hours of the day" the set of possible values is {Between 0:00 and 1:00, Between 1:00 and 2:00, Between 2:00 and 3:00, Between 3:00 and 4:00, . . . Between 21:00 and 22:00, Between 22:00 and 23:00, Between 23:00 and 24:00}.

A dimensions values pair is an ordered pair of a dimension and a value of that dimension. In one example, the possible dimensions are (i) days of the week; (ii) hours of the day; (iii) area code; (iv) days of the months. In this example, one "dimensions value pair" is the pair {Day of Week, Monday}. Another "dimensions value pair" is the pair {Area Code, 609}. Another "dimensions value pair" is the pair {Hour of the Day, between 4 PM and 5 PM}. Another "dimensions value pair" is the pair {Day of the Month, $3^{rd}$ day of the month}.

A hyper-cell a is contained in a hyper-cell b, if and only if all the dimensions values pairs that appear in b also appear in a, and there is in a at least one additional dimension value pair that does not appear in b. In this case, a is also referred to as a "sub-cell" of b.

Thus, in one example, the hyper-cell b is as follows: [{Days of the Week, Monday}, {Hours of the Day, Between 3 PM and 4 PM}]. The hyper-cell a is as follows: [{Days of the Week, Monday}, {Hours of the Day, Between 3 PM and 4 PM}, {Area Code, 201}]. In this example, hyper-cell a is a subcell (or is "contained in") hyper-cell b. Another example of a sub-cell of hyper-cell b is hypercell c defined as [{Days of the Week, Monday}, {Hours of the Day, Between 3 PM and 4 PM}, {Area Code, 201}, {Days Of the Month, Third Day of the Month}].

A hyper-cell b is a one level extension of a hyper-cell a, if a is contained in b, and in b there is exactly one dimension value pair that does not appear in a. In the previous example, hypercell "a" is a "one level extension" of hypercell "b", and hypercell "c" is a one level extension of hypercell "a."

The value of a cell of a cube is its measure value; the value of a hyper-cell is the result of a certain central tendency function (for example, an average) or a measure of dispersion (for example, a variance) or a sum or a minimum or maximum function on the values of all the cells contained in it.

Whether or not a hypercell is an "outlier" is determined by deviation of a score of the hypercell from some central tendency over a population p over multiple hypercells. In one example, given a measurement, and a statistical distribution D with mean $\mu$ standard deviation $\sigma$, and a constant k, a value x of the measurement, will be considered to be an outliner if it $|x-\mu|>k*\sigma$. In other examples: (i) if a score x is bigger that a predefined constant K—if such case the score could be x/K or x-K (depending on the implementation); (ii) is a score x is bigger that the mean of the population p, in such a case the score can be x/mean(p) or x-mean(p) (depending on the implementation); (iii) a certain boolean function f of x and population p is provided—in the example in the text, f(x, p) will be true if abs(x−mean (p))>k*std(p)) likewise the score is a function g of x and population p, g function represents the distance from x and the "regular behavior" of the population.

The 'score' of a hypercell is an indication of a deviation between the hypercell's value and values of hypercells of a given population of hypercells p (for example, a 'large' population of millions or billions or more hypercells).

One example of a score of a hyper-cell given a statistical distribution D with mean $\mu$ and standard deviation $\sigma$, is $|x-\mu|/\sigma$.

Several non-limiting examples are now presented for illustrative purposes.

EXAMPLE 1

Outliers in a Telephone Network and Related Example Hypercells

In the present example, data from two "metering systems" related to call traffic volumes is analyzed. In this example, the first metering system is a "switch metering system" which provides a first metric of call traffic (i.e. by measuring traffic at the switch(es)) and the second metering system is a billing system which provides a second metric of call traffic (i.e. since billing is depends on the call traffic).

There are many situations where there are discrepancies between the first and second metering system. The causes for the differences may be various, e.g., different call rounding and duration calculation methods, rightfully dropped information (test calls dropped by the mediation, 0 duration calls dropped by the billing), or dropped due to mal-function, e.g., an overloaded Switch may stop producing CDRs (call detail records) to reduce its overload. Having discrepancies between the metering systems information, is not yet an alarming sign, having "unusual" levels of discrepancies, is an alarming sign that should be investigated and solved.

It is recognized that these discrepancies will vary as a function of different parameters—i.e. there may be increased (or decreased) discrepancies on certain days of the week and/or at certain hours of the day and/or in traffic between certain area codes and/or on certain days of the month (for example, beginning of the month or middle of the month or end of the month). The elevated discrepancies at certain times and/or certain area codes can be due to any number of reasons, and it is desired to determine the specific times and/or area codes in order to "zero in" on a source of a problem.

In the present example, the call traffic data as determined by each metering system (and the difference in call traffic as determined by the two metering systems) is presented as a "multi-dimensional hierarchical dataset" where the "dimensions" are the "input parameters"—i.e. day of week, day of month, source area code, destination area code, etc.

In the present examples, it is desired to search for and locate "outliers"—sets of value(s) for the parameters (i.e. where there is an elevated difference or discrepancy between the total traffic as reported by the two metering systems (i.e. switching and billing system).

Because the Multidimensional Hierarchical Dataset can be represented as an OLAP Cube (aka cube, aka hypercube), the search for sets of value(s) of the parameters (i.e. for outliers) can be implemented as a search for a subcubes.

In the present non-limiting example, we are working with a 5-dimensional dataset—the five dimensions are: (i) day of week (whose value is selected from {Sun, Mon, Tue, Wed, Thu, Fri}), (ii) hour of day (whose value is selected from {[0:00-0:59], [1:00-1:59], . . . [23:00-23:59]}), (iii) day of month (whose value is selected from {1, 2 . . . 31}), (iv) origin area code, and (v) destination area code.

For the present example, the "dimensions" will be labeled $x_1, x_2, x_3, x_4, x_5$. Thus, in the present example, the $x_1$ or "day of the week" dimension can adopt one of seven values—$x_1^1$ (Sun), $x_1^2$ (Mon), . . . $x_1^7$ (Sat); the $x_2$ or "hour of the day" dimension can adopt one of twenty four values—$x_2^1$ [0:00-0:59], $x_2^2$ [1:00-1:59], . . . $x_2^{24}$ [23:00-23:49]; the $x_3$ or "day of the month" dimension can adopt one of 31 values; the $x_4$ or "origin area code" dimension can adopt one of AC values (where AC is an integer that is the total number of area codes in the telephone network); the $x_5$ or "destination area code" dimension can adopt one of AC values (where AC is an integer that is the total number of area codes in the telephone network).

In the present example, it is desired to determine a subcube (not necessarily a lowest level cell of the hypercell with all 5 dimensions participating) where there is excessive discrepancy between the network traffic as reported by the switching metering system and the network traffic as reported by the billing metering system—i.e. to determine which combinations of the days of week, hours of day, days of month, origin area code, destination area codes, etc. are associated with "outlier" or "excessive" deviations in measurements of total traffic between the two metric systems (i.e. the switching metric and the billing metric).

In some embodiments, it is possible to locate 'large' possible hypercells that are outliers. This may save the need to search subcells of the hypercell.

One example of a potential "outlier" would be the hypercell {null, $x_2^1$, null, null, null} with a single participating 'non-null value' dimension (i.e. having a measure of 1)—this would indicate excessive differences in measured total call traffic volume (i.e. "outlier status") between the two metering systems (i.e. switching and billing) between [0:00-0:59] irrespective of other variables (i.e. irrespective of day of the week, day of the month, origin and destination area code).

Another example of a potential "outlier" would be the hypercell {$x_1^4$, null, $x_3^1$, $x_4^{265}$, $x_5^{591}$} with 4 participating dimensions—this would indicate outlier status for the hypercell representing calls on Wednesday, on the first day of the month with area code "265" as the "origin area code" (where 265<AC) and area code "191" as the "destination area code"—irrespective of hour of the day.

EXAMPLE 2

Analyzing Tuples/Hypercells of Example 1 in a Hypercell/Tuple Set $P_{GIVEN}$ to Identify Outliers According to a presently-disclosed search routine, we begin with a set of tuples or hypercells in the N-dimensional hierarchical data set (i.e. where N=5).

In the present example, the "starting" set {$h_1$, . . . $h_M$} (M=7) of hypercells $P_{GIVEN}$={{$x_1^1$, null, null, null, null}, {$x_1^2$, null, null, null, null}, {$x_1^3$, null, null, null, null}, {$x_1^4$, null, null, null, null}, {$x_1^5$, null, null, null, null}, {$x_1^6$, null, null, null, null}, {$x_1^7$, null, null, null, null}} (i.e. all Sunday calls, all Monday calls, all Tuesday calls, all Wednesday calls, all Thursday calls, all Friday calls). In this example, M=7.

In the present example, value ($h_1$)=0.02; value ($h_2$)=0.01; value ($h_3$)=0.05; value ($h_4$)=0.05; value ($h_5$)=0.01; value ($h_6$)=0.03; value ($h_7$)=0.03. Thus, the discrepancy between the reported traffic (i.e. as reported by the two different metering systems—i.e. the switch metering system and the billing metering system) is greatest, in the present example, on Tuesdays and Wednesdays.

In the present example, the score of each given hypercell $h_i \in P_{GIVEN}$ is analyzed to determine if the "given hypercell" is an outlier (i.e. by analyzing the magnitude of the score). If the score exceeds some numerical threshold (for example, 0.04), the given hypercell $h_i \in P_{GIVEN}$ is identified as an "outlier hypercell." Thus, in our example, if it is determined that a given day is an "outlier" (i.e. in our example, the metered traffic according to the two systems differs by a given threshold), there is no need to further investigate other parameters for the given day—the day "as a whole" is identifier as an outlier hypercell/tuple and there is no need to analyze subcubes of the identified "given" hypercell (i.e. no need to analyze the score of sub-cubes of the "identified outlier hypercell" that include additional participating dimensions—i.e. hour of the day, area code, etc).

In the present example, when analyzing the score of each hypercell $h_i \in P_{GIVEN}$, one of three outcomes are possible: either (i) none of the cells of $P_{GIVEN}$ are classified (i.e. according to respective "outlier scores") as outliers—i.e. day of the week alone is not sufficient identify "outliers" between the switch metering system and the billing metering system; (ii)

some of the cells of $P_{GIVEN}$ are classified (i.e. according to respective "outlier scores"); and (iii) all of the cell of $P_{GIVEN}$ are classified as outliers.

EXAMPLE 3

Handling Rejected Hypercells/Tuples of Example 2 by Constructing and Analyzing "1-Level Extensions" of the Rejected Hypercells/Tuples According to the first and second possibilities, one or more cells of $P_{GIVEN}$ are not classified as outliers—i.e. are "rejected" as outliers (according to our example where the threshold is 0.04, $h_1$, $h_2$, $h_5$, $h_6$ and $h_7$ would be "rejected."

There are two possible handlings for the rejected "hypercells." According to one handling, the rejected hypercells are further "extended." Thus, according to our present example, it is postulated that for a given hypercell (for example, the "Thursday" hypercell), the participating dimension set of the hypercell with the given values (i.e. in the example of the "Thursday" hypercell, the participating dimension set is "day of the week" or $x_1$) is not sufficient to identify the hypercell as an outlier.

Nevertheless, it is possible that certain sub-regions or sub-cubes of the hypercell (i.e. "extensions") are indeed outliers. For example, it is possible that even if the "Thursday" hypercell (i.e. with a single participating dimension) is not an outlier, nevertheless, the discrepancy (i.e. for the two metering systems—in this case, switching and billing) of the data for Thursday with given "origin area code" (for example, area code 265) is so great that the sub-cell represented by the set of data for Thursday with the area code 265 is itself an outlier.

Thus, in our example, the "rejected" "Thursday" hypercell $\{x_1^5, \text{null}, \text{null}, \text{null}, \text{null}\}$ may be "extended" to include an additional dimension (i.e. in this case, the "source area code" dimension). In our example, the "rejected" hypercell $\{x_1^5, \text{null}, \text{null}, \text{null}, \text{null}\}$ may be extended to generate the sub-hypercell $\{x_1^5, \text{null}, \text{null}, x_4^{265}, \text{null}\}$.

EXAMPLE 4

A Discussion of the Flowchart of FIG. 1

FIG. 1 provides a flow chart of an exemplary technique for identifying outlier hyper-cells in an N-dimensional hierarchical datset having dimensions $\{x_1, \ldots x_N\}$ according to some embodiments of the present invention.

In some embodiments, the value of N is at least 5, or at least 10, or at least 15.

In step S201, a plurality $P_{GIVEN}$ of hypercells $\{h_1, \ldots h_M\}$, is provided and analyzed where M is an integer greater than 1 (in many examples, greater than 10, or greater than 100).

In some embodiments, the plurality of hypercells $P_{GIVEN}$ is dimensionally homogenous—i.e. each hypercell $h_i$ (where i is an integer greater than or equal to 1, less than or equal to M) has the same set of participating dimensions. The "starting set" of example 2 is one example where $P_{GIVEN}$ is dimensionally homogenous.

Nevertheless, we note that this is not a limitation.

In some embodiments, $P_{GIVEN}$ is not dimensionally homogenous—i.e. dimensionally inhomogenous—i.e. there exist two distinct integers i,j where both of i and j are greater than or equal to 1, less than or equal to M where the set of participating dimensions for $h_i$ is different from the set of participating dimensions for $h_j$.

In example 2, only one dimension "participates" in $P_{GIVEN}$, namely the first dimension of 5 possible dimensions. In some embodiments, multiple dimensions "participate" in $P_{GIVEN}$. For the present disclosure, when a dimension participate in a set of hypercells, the dimension participates in at least one hypercell within the set of hypercells.

Alternatively and preferably, $P_{GIVEN}$ is a "majority spanning" set of hypercells—i.e. $P_{GIVEN}$ is such that a majority of possible dimensions (i.e. at least N/2 dimensions) "participate" in $P_{GIVEN}$, where $P_{GIVEN}$ includes at least int cells (where int is an integer that is equal to or greater than N/2) such that each cell of the at least int cells includes a different respective participating dimension.

In one example, $P_{GIVEN}$ includes a majority of possible primitive hypercells. In one example where N=2 and the first dimension is a boolean dimension and the second dimension is the days of the week, the possible primitive hypercells are as follows: [{Boolean, True}], [{Boolean, False}], [{Day of Week, Sunday}], [{Day of Week, Monday}], [{Day of Week, Tuesday}], [{Day of Week, Wednesday}], [{Day of Week, Thursday}], [{Day of Week, Friday}].

In one example, $P_{GIVEN}$ includes primitive hypercells from a majority of possible dimensions.

It is understood that any of these examples may be "combined" when appropriate—for example, $P_{GIVEN}$ may include both majority of possible primitive hypercells and primitive hypercells from a majority of possible dimensions.

In step S201, the values of each hypercell are analyzed and compared. In step S205, the hypercells with the highest "outlier" score (for example, all cells whose score exceeds a pre-determined "outlier" threshold, or a certain number of certain fraction of $P_{GIVEN}$) are designated/reported/accepted as hypercells. Those cells $P^1_{CAT} \subset P_{GIVEN}$ which are designated as hypercells (in example 2 this would be $h_3$ and $h_4$), are designated as "likely-outliers," while the other cells $P^2_{CAT}$ in $P_{GIVEN}$ (i.e. $P^2_{CAT}$ is the complement of $P^1_{CAT}$ in $P_{GIVEN}$) are designated as "less likely outliers" and are not identified as outliers at this stage.

In one example, in step S201, all hypercells whose outlier score exceeds a given threshold may be selected. Alternatively or additionally, other criteria for determining what is and is not a "likely outlier" may be established. In one example, some fraction (for example, the "best 15%" of hypercells of $P_{GIVEN}$) may be categorized as outliers. The skilled artisan will appreciate that different variations are possible in step S201.

In step S209 the cells of $P^2_{CAT}$ handled. In particular, the cells of $P^2_{CAT}$ are divided into two subsets: (i) those "more likely to be outliers" among those previously rejected in step S205 (i.e. $P_{SUB} \subset P^2_{CAT}$) (these are informally known as the "winners of the losers"); and (ii) all other cells in $P^2_{CAT}$ (these are informally known as the "losers of the losers").

It is possible that more than one subset of $P^2_{CAT}$ may be selected. The subset $P_{SUB}$ does not include any "lowest-level hypercells" when every dimension participates.

In step S213, a set of 1-level extensions $P^1_{EXT}$ is formed from $P_{SUB}$ where cells of $P_{SUB}$ are extended at least once to form a different respective at least 1-level extension. In one example, for at least one 1-level extension, all possible 1-level extensions (or even a majority of possible 1 level extensions) are formed.

In step S225, it is decided for which hypercells is to desired to recurse. This set of hypercells $P'_{GIVEN}$ for recursing includes at least some hypercells of $P^1_{EXT}$ (i.e. formed in step S213) and optionally one or more additional hypoercells (for example, hypercells which were earlier considered "losers of losers" $P^2_{CAT}$).

In step S225, it is noted that set $P'_{GIVEN}$ is formed (i.e. the 'decision process' for which hypercells to include in $P'_{GIVEN}$ is carried out such that) such that there is at least one one-level extension of a member cell mc mc∈P²CAT that is included in P'$_{GIVEN}$ only if: i) hc is not a previously considered hypercell (i.e a hypercell which has not analyzed in step S201); and ii) hc is not a subcell of a previously categorized likely-outlier hypercell (i.e. categorized/or reported in step S201). This condition may reduce the number of hypercells that need to be analyzed.

In the event that P'$_{GIVEN}$ is empty S245 (or alternatively, according to another other stop condition—for example, number of iterations, amount of time the routine executes, number of outliers located or any other stop condition familiar to the skilled artisan), the routine stops in step S249.

Otherwise, P$_{GIVEN}$ is set to P'$_{GIVEN}$ and the routine continues with the new value of P$_{GIVEN}$ affording an opportunity to identify and/or locate and/or report even more outlier hypercells.

It is noted that in step S213, not every possible 1-level extension is always formed. In one non-limiting example, no 1-level extension is formed (and/or no 1-level extension is subsequently analyzed) that is (i) the same as a previously analyzed cell (for example, if the hypercell of phone calls that are Monday between 4 PM and 5 PM was already analyzed, we will not form and/or analyze the 1-level extension of {Monday} to {Monday, 4 PM to 5 PM} and we will not form and/or analyze the 1-level extension of {4 PM to 5 PM} to {4 PM to 5 PM, Monday}).

Also, according to this non-limiting example, no 1-level extension is formed and/or analyzed (or alternatively, included in P'$_{GIVEN}$ in step S225) that is a sub-cell of a cell which was already reported/accepted as an "outlier" in step S205. Thus, in the event that in step S205 the hypercell {Thursday} is accepted, we will not form a 1-level extension of the hypercell {10 AM to 11 AM} to form the 1-level extension {10 AM to 11 AM, Thursday} because the hypercell {10 AM to 11 AM, Thursday} is a subcell of the hypercell {Thursday} which was already accepted as an "outlier hypercell."

The logic behind this constraint (either enforced in step S213 and/or in step S225) is that if "Thursday" as a whole is already a known hypercell, there is no need to investigate "sub-sets" of this hypercell. It is noted that these constraints of step S213 allow, in many situations, the technique described in FIG. 1 to analyze a very small subset of the total set of possible hypercells while still finding the most problematic hypercell.

In one example, due the constraint enforced in step S213 and/or in step S225 the total number of dimensions is greater than 10, on average each dimension has a total number of 1,000 possible values, and between 1% and 5% of all hypercells are outliers. In this example, the number of possible hypercells is more than a billion, yet a very small fraction of hypercells need to be analyzed in step S201

EXAMPLE 5

Exemplary Criteria for Determining in Step S209 which Rejected Hypercells are Extended for Further Analysis (i.e. of Sub-Regions) and which Rejected Hypercells not Extended In this example, two of the 7 hypercells in P$_{GIVEN}$, are "accepted" or identified as outliers—say $h_3$ and $h_4$ (i.e. Tuesday and Wednesday are "outliers") (this is a first "categorized set" of hypercells P¹CAT={$h_3$, $h_4$}, while five of the 7 hypercells in P$_{GIVEN}$ are "rejected" as outliers (this is the second "categorized set" of hypercells P²CAT={$h_1$, $h_2$, $h_5$, $h_6$, $h_7$}

In this example, only a subset P$_{SUB}$ ⊂ P²CAT of the rejected (or not-identified-as-outlier) hypercells are extended (i.e. the "winners of the losers"). The hypercells of the complement of the subset P$_{SUB}$ are not further analyzed and not extended.

According to one set of criteria, P$_{SUB}$ is determined from P²CAT in accordance with the absolute and/or relative "outlier" scores of hypercells of P$_{SUB}$.

Thus, in one example, P$_{GIVEN}$ is handled as follows:
i) those hypercells of P$_{GIVEN}$ whose "outlier score" exceeds a first threshold thresh$_1$ (i.e. a positive number associated with the greater discrepancy between the network traffic as reported by the "switch metering system" and the "billing metering system"—the greater the outlier score the greater the discrepancy between the two metering systems for the hypercell) are identified/reported as "outliers" and assigned to the "first categorized set" of hypercells P¹CAT ⊂ P$_{GIVEN}$ Once these hypercells of P¹CAT ⊂ P$_{GIVEN}$ are reported as outliers there is no need to construct extensions of these "outlier hypercells." In our example, thresh$_1$=0.04 and P¹CAT={$h_3$, $h_4$}.

The complement of P¹CAT ⊂ P$_{GIVEN}$ is P²CAT ⊂ P$_{GIVEN}$-hypercells whose "outlier score" does not exceed thresh$_1$. In our example, P²CAT={$h_1$, $h_2$, $h_5$, $h_6$, $h_7$}

In one example, hypercells of P²CAT are handled as follows:
i) those hypercells of P²CAT whose "outlier score" does exceed a second threshold thresh$_2$<thresh$_1$ (for example, thresh$_2$=0.25) (i.e. those hypercells that exhibit a certain likelihood to be outliers or to have outlier "subregions" but not enough of a likelihood to be categorized themselves as outliers in and of themselves—the "winners of the losers") are "extended"—i.e. for each hypercell $k_j$∈P$_{SUB}$, a respective one-level extension is formed. Thus, in our example, extensions are only formed from P$_{SUB}$={$h_6$, $h_7$} (i.e. Friday and Saturday are the "winners of the losers"). In different example, the requirements of step S213 must be met.
ii) assigned to P$_{GIVEN}$.

EXAMPLE 6

Some applications of the routine of FIG. 1 are now discussed.

EXAMPLE 6A

In one example, the importance of detecting sub cubes that are outliners, instead of mere low level cells that are outliners, is that by detecting the relevant sub cube we gain an insight of the communalities of the outliners, permitting faster identification and solution of underline problems that caused the outliners, resulting in many cases in substantial economical benefits, this is exemplified in more details in one of the preferred embodiments.

EXAMPLE 6B

Problems like incorrectly processed or dropped usage information like call records (e.g., CDRs) between two systems (e.g., output switch and vs. input to billing system, or output of switch vs. output of signaling system like SS7) cause significant losses of money since users are not billed or are billed incorrectly for services they use (if they are under billed the lost is evident, if they are over billed the service provider is exposed to law suits that can result in significant losses). Identifying these problems typically requires analyzing and comparing either all the CDRs in the two systems, or taking a sample of them. Analyzing and comparing all the CDRs is an extremely computational resource demanding (bandwidth to pass all the information, CPU power, etc), and in many cases the high hardware and operational costs, do not justify the economical benefit from a detailed comparison. On the other hand just taking random samples, will lead in many cases to miss problems, and loose of money. The routine described in FIG. 1 permits spotting subsets of the hyper space where there are irregular behaviors, and this information may be passed to a revenue assurance system that uses it to compare all the information in the irregular hypercube—permitting on one hand to testing all the relevant information, but doing so with modest costs, achieving economical benefits.

For example, assume that the switches generate 1 billion calls per day representing a total of 5 billion minutes, and that 900 million calls arrive to the billing system representing 4 billion minutes, a detailed comparison in an revenue assurance system, will require loading to the revenue assurance system 1.9 billion calls, and for each call in the mediation finding the correspondent call in the billing (if exists), and comparing their duration. This is extremely costly. On the other hand making a random sampling of calls, might lead not to detecting the problem specially if the problem is not distributed more or less uniformly. The routine of FIG. 1 may detect a sub hyper cube in which the behavior is irregular, e.g. calls on Monday that started in [23:00-23:59], from area code 03 to area code 04. By passing this information to the revenue assurance system the revenue assurance system can load and test only information related to the relevant calls, detailed comparing the calls in the sub hyper cube, and finding the specific dropped calls and calls whose duration is incorrect, making the process very efficient and requiring resources that justify its economical benefit.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

EXAMPLE 7

Figure 2:
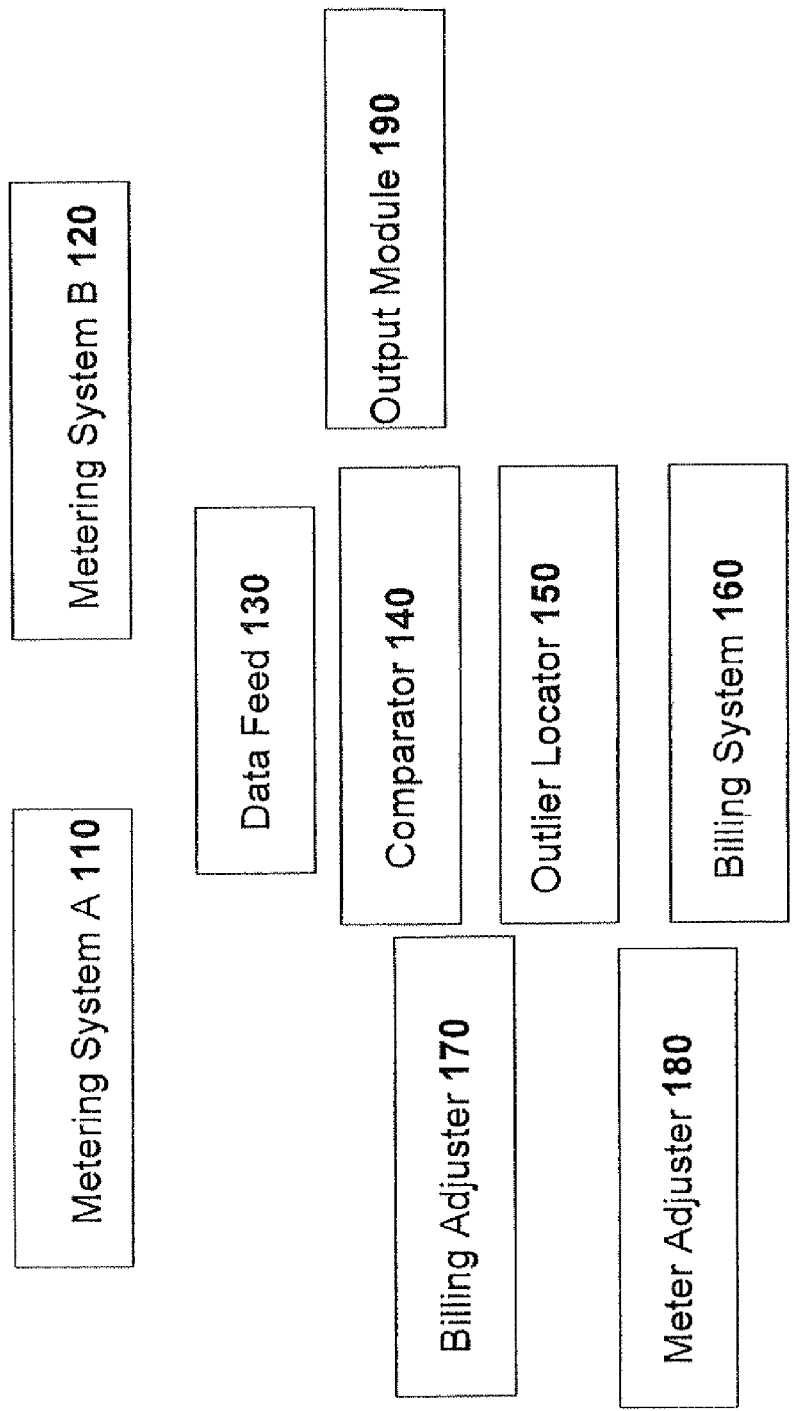
FIG. 2 provides a block diagram of an exemplary system in which the routine of FIG. 1 may be carried out.

FIG. 2 provides a block diagram of an exemplary system in which the routine of FIG. 1 may be carried out. The system includes data feed 130 (which provides data about metering system A 110 and metering system B 120), comparator 140 (for example, for determining discrepancies between measured values of each metering system under different conditions—i.e. time of day, area code, etc. thereby determining values or scores of different hypercells), and outlier locator 150 for locating and/or identifying hypercells. In some embodiments, the output of outlier locator 150 (i.e. a description or indication of the outlier hypercells) may be fed to output module 190 (for example, a display screen or a printer for reporting hypercells—for example, see step S205), and/or billing system 160 (for example, for refunding a previously overbilled subscriber and/or charging a previously underbilled subscriber) and/or meter adjuster 180 (which may adjust operating parameter(s) of metering system A 110 and/or metering system B 120 in order to attempt to reduce future discrepancies).

Any component in FIG. 2 may be implemented in any appropriate combination of hardware and/or software (for example, which may be executed by a processor). The system (or any component thereof) of FIG. 2 may be deployed in any manner, either locally in a single location or in a 'distributed' manner at different locations.

EXAMPLE 8

Figure 3:
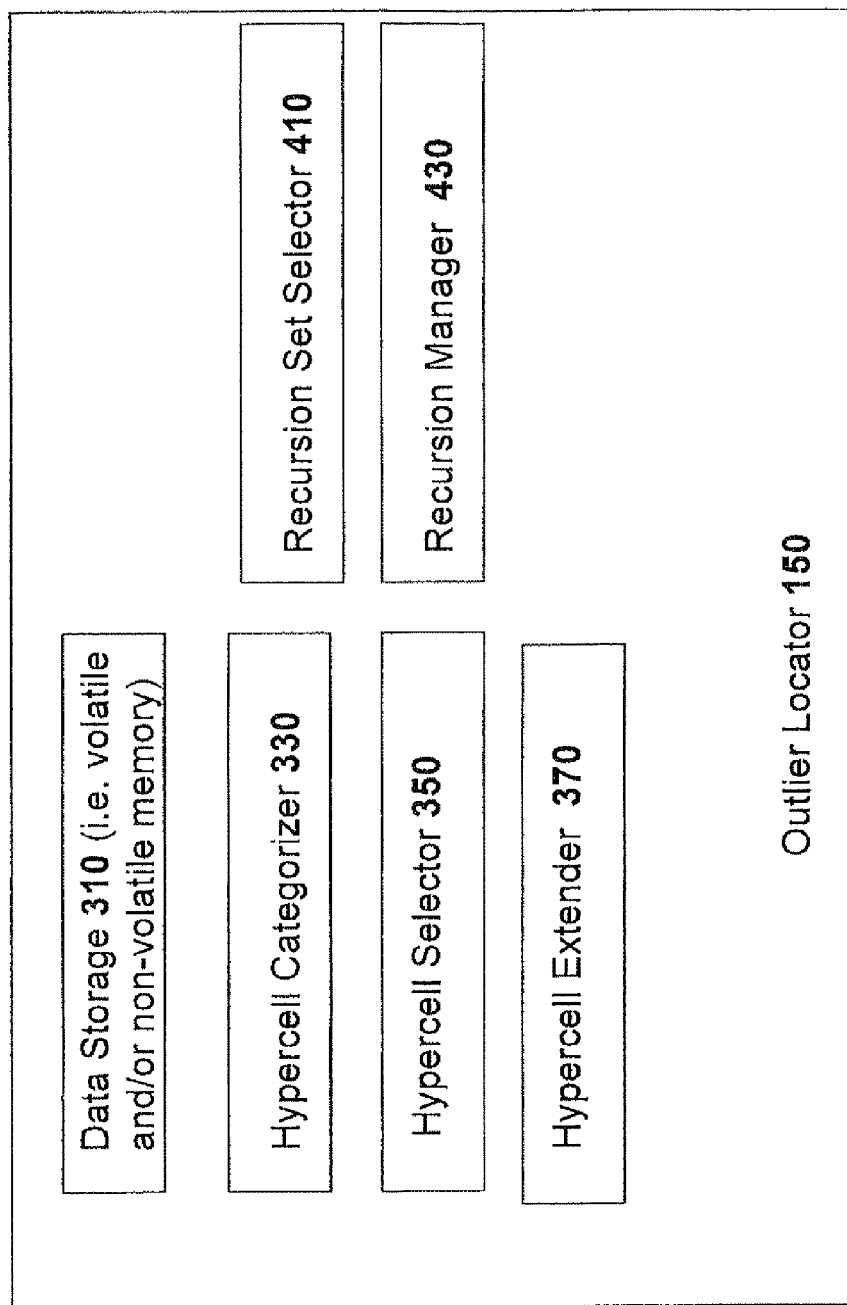
FIG. 3 provides a block diagram of an exemplary outlier locator 150 in accordance with some embodiments of the present invention.

FIG. 3 provides a block diagram of an exemplary outlier locator 150 in accordance with some embodiments of the present invention. The system of FIG. 3 includes: a) a data storage 310 (for example, including volatile storage such as RAM and/or non-volatile storage such as flash or disk or any other volatile and/or non-volatile storage) for storing a representation of a plurality $P_{GIVEN}$ of hypercells $\{h_1, \ldots h_M\}$ for the N dimensions, each said hypercell $h_i \epsilon P_{GIVEN}$ having a respective participating-dimension set $D_i \subset \{x_1, \ldots x_N\}$, for said each hypercell $h_i$ of said given plurality $P_{GIVEN}$; b) a hypercell categorizer 330 for categorizing S201, in accordance with a respective outlier score of said each hypercell $h_i$, said each hypercell $h_i$ as one of: i) a likely outlier hypercell; and ii) a less-likely outlier hypercell, such that: i) a first categorized plurality $P^1_{CAT}$ of said hypercells is categorized as likely-outliers; and ii) a second categorized plurality $P^2_{CAT}$ of said hypercells is categorized as less-likely-outliers; c) a hypercell selector 350 operative to select S209 a sub-plurality $P_{SUB} \subset P^2_{CAT}$ of hypercells $\{k_1, \ldots k_L\}$ from said second categorized plurality $P^2_{CAT}$ of less-likely-outliers in accordance with said outlier scores of hypercells said sub-plurality $P_{SUB} \subset P^2_{CAT}$ of hypercells; d) a hypercell extendor 370 operative to form S213 from said sub-plurality $P_{SUB}$ of hypercells, a one-level-extension hypercell set of $P^1_{EXT}$ including, for each hypercell $k_j$ of $P_{SUB}$, a respective at least one one-level extension of said each hypercell $k_j$ of $P_{SUB}$; e) a recursion set selector 410 operative to define S225 a set $P'_{GIVEN}$ which includes at least some hypercells of $P^1_{EXT}$ such that there is at least one one-level-extension hypercell hc, which is a one-level extension of a member cell mc mc$\epsilon P^2_{CAT}$ that is included in $P'_{GIVEN}$ only if: i) hc is not a previously considered hypercell; ii) hc is not a subcell of a previously categorized likely-outlier hypercell; and f) a recursion manager 430 operative to: A) pass the representation of $P_{GIVEN}$ to the hypercell categorizer 330 and receive a representation of $P^2_{CAT}$ from the hypercell categorizer 330; B) pass the received representation of $P^2_{CAT}$ to the hypercell 350 selector and receive a representation of $P_{SUB}$ from the hypercell selector 350; C) pass the received representation of $P_{SUB}$ to the hypercell extender 360 and receive a representation of $P^1_{EXT}$ from the hypercell extender 360; D) pass the representation of $P^1_{EXT}$ to the recursion set selector 350 and to receive a representation of $P'_{GIVEN}$ from the recursion set selector 350; E) set $P_{GIVEN} = P'_{GIVEN}$ in the memory and repeat steps (A)-(D).

Any component in FIG. 3 may be implemented in any appropriate combination of hardware and/or software (for example, which may be executed by a processor). The system (or any component thereof) of FIG. 3 may be deployed in any manner, either locally in a single location or in a 'distributed' manner at different locations.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer program product encoding a computer program stored on a non-transitory computer readable storage medium for executing a set of instructions by a computer system comprising one or more computer processors for carrying out a method for identifying outlier hyper-cells in an N-dimensional hierarchical dataset having dimensions $\{x_1, \ldots X_N\}$, the method comprising:

a) given a plurality $P_{GIVEN}$ of hypercells $\{h_1, \ldots h_m\}$ for the N dimensions, each said hypercell $h_i \in P_{GIVEN}$ having a respective participating-dimension set $D_i \subset \{x_1, \ldots X_N\}$, for said each hypercell $h_i$ of said given plurality $P_{GIVEN}$, categorizing, in accordance with a respective outlier score of said each hypercell hi, said each hypercell hi as one of:
  i) a likely outlier hypercell; and
  ii) a less-likely outlier hypercell, such that:
  i) a first categorized plurality $P^1CAT$ of said hypercells is categorized as likely-outliers;
  and ii) a second categorized plurality $P^2CAT$ of said hypercells is categorized as less-likely-outliers;

b) selecting a sub-plurality $P_{SUB} \subset P^2CAT$ of hypercells $\{k_1 \ldots k_L\}$ from said second categorized plurality $P^2CAT$ of less-likely-outliers in accordance with said outlier scores of hypercells said sub-plurality $P_{SUB} \subset P^2CAT$ of hypercells;

c) from said sub-plurality $P_{SUB}$ of hypercells, forming a one-level-extension hypercell set of $P^1EXT$ including, for each hypercell $k_j$ of $P_{SUB}$, a respective at least one one-level extension of said each hypercell $k_j$ of $P_{SUB}$;

d) defining a set $P'_{GIVEN}$ which includes at least some hypercells of $P^1EXT$ such that there is at least one one-level-extension hypercell hc, which is a one-level extension of a member cell mc mc $\in P^2CAT$ that is included in $P'_{GIVEN}$ only if
  i) hc is not a previously considered hypercell;
  ii) hc is not a subcell of a previously categorized likely-outlier hypercell; and e) assigning $P_{GIVEN} = P'_{GIVEN}$ and repeating steps (a)-(d).

2. The computer program product of claim 1 wherein hypercells of $P_{GIVEN}$ are dimensionally inhomogeneous.

3. The computer program product of claim 1 wherein hypercells of $P_{GIVEN}$ are dimensionally homogenous.

4. The computer program product of claim 1 wherein a majority of hypercells of $P_{GIVEN}$ are primitive hypercells where every dimension participates.

5. The computer program product of claim 1 wherein $P_{GIVEN}$ includes primitive hypercells from a majority of dimensions of the N dimensions of the dimensions $\{x_1, \ldots x_N\}$.

6. The computer program product of claim 1 wherein $P_{GIVEN}$ includes a majority of possible primitive hypercells.

7. The computer program product of claim 1 wherein $P_{GIVEN}$ is a majority spanning plurality of hypercells.

8. The computer program product of claim 1 wherein said one-level extension of step (c) is dimensionally homogeneous.

9. The computer program product of claim 1 wherein said one-level extension of step (c) is dimensionally in homogeneous.

10. The computer program product of claim 1 wherein $P'_{GIVEN}$ includes, for at least one hypercell of $P^2CAT$, a majority of possible one-dimensional extensions which are not previously considered hypercells and not subcells of a previously categorized likely-outlier hypercell.

11. The computer program product of claim 1 wherein:
  i) the hypercells are descriptive of discrepancies between two metering systems; and
  ii) the method further comprises:
    e) in accordance with identities of the categorized outlier hypercells of a plurality of iterations of step (b) providing a representation of the categorized outlier hypercells to a user.

12. The computer program product of claim 1 wherein:
  i) the hypercells are descriptive of discrepancies between two metering systems; and
  ii) the method further comprises:
    e) in accordance with identities of the categorized hypercells of a plurality of iterations of step (b), billing or crediting a subscriber.

13. The computer program product of claim 1 wherein:
  i) the hypercells are descriptive of discrepancies between two metering systems; and
  ii) the method further comprises:
    e) in accordance with identities of the categorized hypercells of a plurality of iterations of step (b), adjusting an operating parameter of at least one of the two metering systems.

14. The computer program product of claim 1 wherein both metering systems measures at least one of water consumption, oil consumption, gas consumption, electricity consumption and telecommunications services consumption.

15. A system for identifying outlier hyper-cells in an N-dimensional hierarchical dataset having dimensions $\{x_1, \ldots X_N\}$, the system comprising:

a) a data storage for storing a representation of a plurality $P_{GIVEN}$ of hypercells $\{h_1, \ldots h_m\}$ for the N dimensions, each said hypercell $h_i \in P_{GIVEN}$ having a respective participating-dimension set $D_i \subset \{x_1, \ldots X_N\}$ for said each hypercell hi of said given plurality $P_{GIVEN}$;

b) a hypercell categorizer for categorizing, in accordance with a respective outlier score of said each hypercell $h_i$, said each hypercell $h_i$ as one of:
  i) a likely outlier hypercell; and
  ii) a less-likely outlier hypercell,
  such that;
  i) a first categorized plurality $P^1CAT$ of said hypercells is categorized as likely-outliers; and
  ii) a second categorized plurality $P^2CAT$ of said hypercells is categorized as less-likely-outliers;

c) a hypercell selector operative to select a sub-plurality $P_{SUB} \subset P^2CAT$ of hypercells $\{k_1, \ldots k_L\}$ from said second categorized plurality $P^2CAT$ of less-likely-outliers in accordance with said outlier scores of hypercells said sub-plurality $P_{SUB} \subset P^2CAT$ of hypercells;

d) a hypercell extender operative to form from said sub-plurality $P_{SUB}$ of hypercells, a one-level-extension hypercell set of $P^1EXT$ including, for each hypercell $k_j$ of $P_{SUB}$, a respective at least one one-level extension of said each hypercell $k_j$ of $P_{SUB}$;

e) a recursion set selector operative to define a set $P'_{GIVEN}$ which includes at least some hypercells of $P^1EXT$ such that there is at least one one-level-extension hypercell hc, which is a one-level extension of a member cell mc mc $\in P^2CAT$ that is included in $P'_{GIVEN}$ only if:
  i) hc is not a previously considered hypercell;
  ii) hc is not a subcell of a previously categorized likely-outlier hypercell; and f) a recursion manager operative to:
- A) pass the representation of $P_{GIVEN}$ to the hypercell categorizer and receive a representation of $P^2CAT$ from the hypercell categorizer;
- B) pass the received representation of $P^2CAT$ to the hypercell selector and receive a representation of $P_{SUB}$ from the hypercell selector;
- C) pass the received representation of $P_{SUB}$ to the hypercell extender and receive a representation of $P^1EXT$ from the hypercell extender
- D) pass the representation of $P^1EXT$ to the recursion set selector and to receive a representation of $P'_{GIVEN}$ from the recursion set selector 350;
- E) set $P_{GIVEN} = P'_{GIVEN}$ in the memory and repeat steps (A)-(D).

16. The system of claim 15 where the hypercells are descriptive of discrepancies between two metering systems, and the system further comprises:

- g) a user output module configured, in accordance with identities of the categorized outlier hypercells of a plurality of iterations of step (b), to provide a representation the categorized outlier hypercells to a user.

17. The system of claim 15 where the hypercells are descriptive of discrepancies between two metering systems, and the system further comprises:

- g) a billing adjuster configured, in accordance with identities of the categorized outlier hypercells of a plurality of iterations of step (b), to bill or credit a subscriber.

18. The system of claim 15 where the hypercells are descriptive of discrepancies between two metering systems, and the system further comprises:

- g) a meter adjuster configured, in accordance with identities of the categorized outlier hypercells of a plurality of iterations of step (b), to adjust an operating parameter of at least one of the metering systems.

* * * * *